(12) United States Patent
Singaravelu Vanaja et al.

(10) Patent No.: US 9,672,091 B2
(45) Date of Patent: Jun. 6, 2017

(54) STORAGE DEVICE AND DEBUGGING METHOD THEREOF

(71) Applicant: SAMSUNG ELECTRONICS CO., LTD., Suwon-si, Gyeonggi-do (KR)

(72) Inventors: Deepa Singaravelu Vanaja, Suwon-si (KR); Young-Deok Kim, Gwacheon-si (KR); Chulwon Yang, Ansan-si (KR); Ramkumar Dhanasekaran, Suwon-si (KR); Donghyuk Ihm, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 17 days.

(21) Appl. No.: 14/937,370

(22) Filed: Nov. 10, 2015

(65) Prior Publication Data

US 2017/0132067 A1    May 11, 2017

(51) Int. Cl.
| | | |
|---|---|---|
| *G06F 11/00* | (2006.01) | |
| *G06F 11/07* | (2006.01) | |
| *H04W 4/00* | (2009.01) | |

(52) U.S. Cl.
CPC ...... *G06F 11/0778* (2013.01); *G06F 11/0727* (2013.01); *G06F 11/0751* (2013.01); *H04W 4/008* (2013.01)

(58) Field of Classification Search
USPC .......................................................... 714/45
See application file for complete search history.

(56) References Cited

U.S. PATENT DOCUMENTS

| | | | |
|---|---|---|---|
| 7,679,133 B2 | 3/2010 | Son et al. | |
| 7,788,553 B2 | 8/2010 | Chow et al. | |
| 7,873,885 B1 | 1/2011 | Shin et al. | |
| 8,086,919 B2 | 12/2011 | Chen et al. | |
| 8,331,175 B2 | 12/2012 | Bang et al. | |
| 8,553,466 B2 | 10/2013 | Han et al. | |
| 8,559,235 B2 | 10/2013 | Yoon et al. | |
| 8,627,158 B2 | 1/2014 | Cadigan et al. | |
| 8,654,587 B2 | 2/2014 | Yoon et al. | |
| 8,719,485 B2 | 5/2014 | Sutardja et al. | |
| 8,949,672 B1 | 2/2015 | Srihamat et al. | |
| 8,966,319 B2 | 2/2015 | Fai et al. | |
| 2006/0095794 A1* | 5/2006 | Nunnelley | G06F 21/31 713/193 |
| 2009/0254999 A1* | 10/2009 | Julin | G06F 11/0748 726/28 |
| 2011/0233648 A1 | 9/2011 | Seol et al. | |
| 2012/0191402 A1 | 7/2012 | Filler et al. | |
| 2014/0047286 A1 | 2/2014 | Lee et al. | |
| 2014/0068342 A1 | 3/2014 | Chuang | |
| 2014/0163716 A1 | 6/2014 | Chang et al. | |
| 2015/0095717 A1* | 4/2015 | Frenz | G06F 11/323 714/46 |

(Continued)

*Primary Examiner* — Sarai Butler
(74) *Attorney, Agent, or Firm* — Volentine & Whitt, PLLC

(57) ABSTRACT

Disclosed is a storage device which generates dump data at occurrence of an error. The storage device includes a buffer memory comprising a dump area for storing the dump data, a wireless module configured to transmit the dump data to a wireless channel, and a storage controller configured to monitor a generation of the dump data, to turn on the wireless module at the generation of the dump data, and to transmit the dump data to the wireless module.

15 Claims, 16 Drawing Sheets

(56) References Cited

U.S. PATENT DOCUMENTS

2015/0261597 A1* 9/2015 Darisa ................. G06F 11/0727
                                                    714/48
2015/0364218 A1* 12/2015 Frayer ................... G11C 29/44
                                                    714/6.13
2015/0378841 A1* 12/2015 Jayakumar ............ G06F 9/4401
                                                    714/6.12

* cited by examiner

STORAGE DEVICE AND DEBUGGING METHOD THEREOF

BACKGROUND

Embodiments of the inventive concept relate to a semiconductor memory device, and in particular, to a storage device and a debugging method thereof.

A flash memory device is being used as voice and image data storage media of information devices such as a computer, a smart phone, a personal digital assistant (PDA), a digital camera, a voice recorder, an MP3 player, a handheld PC, and the like. However, since an erase operation is performed before writing data at a flash memory, a unit of data to be written may be greater than a unit of data to be erased. This makes it difficult to utilize a file system for typical hard disk even in the case where a flash memory is used as an auxiliary storage device. In addition, the above-described characteristic means that sequential input/output processing of the flash memory is more efficient than non-sequential input/output processing.

A solid state drive (SSD) is a representative of a flash memory-based mass storage device. The use of the SSD diversifies as the demand for the SSD explosively increases. For example, the use of the SSD is divided into SSD for server, SSD for client, SSD for data center, and the like. The SSD for the above-described uses may be managed and maintained to provide high reliability and optimized quality of service.

However, an unexpected error may occur due to a hardware or software problem during an operation of the above-described SSD. In this case, the SSD may generate and collect dump data. The SSD from which an error arises is connected to a debugging tool or device to perform dump data based debugging. The SSD is separated from a host, on which it is mounted, to the debugging tool and is connected to a separate interface. For this reason, it is difficult to obtain all real-time state information at an error-occurring point in time for exact debugging about the SSD.

SUMMARY

Embodiments of the inventive concept provide a storage device which is capable of transmitting dump data or log information without loss in the case where a problem occurs and a debugging method thereof.

One aspect of embodiments of the inventive concept is directed to provide a storage device which generates dump data at occurrence of an error. The storage device may include a buffer memory comprising a dump area for storing the dump data, a wireless module configured to transmit the dump data to a wireless channel, and a storage controller configured to monitor a generation of the dump data, to turn on the wireless module at the generation of the dump data, and to transmit the dump data to the wireless module.

Another aspect of embodiments of the inventive concept is directed to provide a debugging method of a storage device electrically connected with a host, the debugging method including determining whether dump area exists in a dump area of a buffer memory, turning on a wireless module based on the determination result, transmitting the dump data to a debugging device through the wireless module, and turning off the wireless module.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
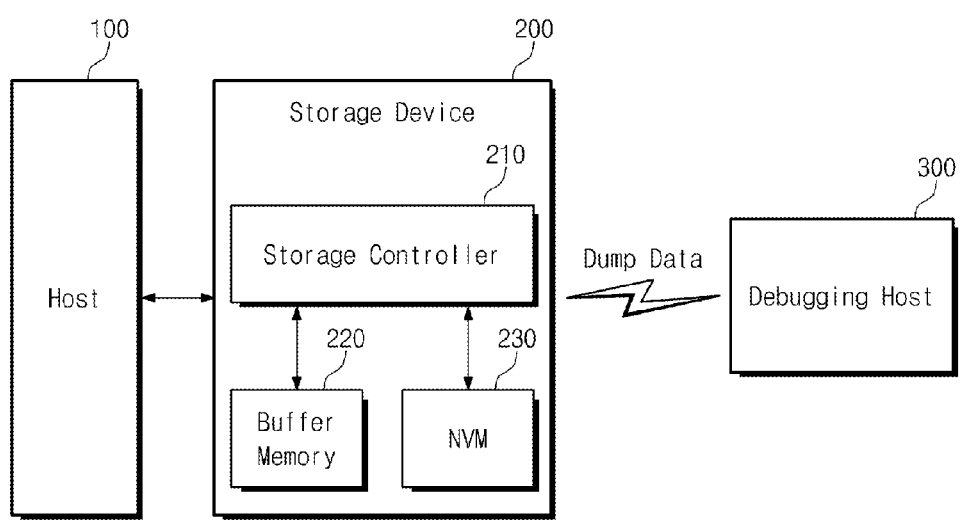
FIG. 1 is a block diagram illustrating a storage device, a server system including the same, and a debugging host according to an embodiment of the inventive concept.

Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

Below an embodiment of the inventive concept is exemplified as a solid state drive using a flash memory device is a storage device according to an embodiment of the inventive concept. However, the scope and spirit of the inventive concept may not limited thereto. The inventive concept may be applied or implemented through different embodiments. In addition, the detailed description may be variously modified or changed without departing from the scope and spirit of the inventive concept.

FIG. 1 is a block diagram illustrating a storage device, a server system including the same, and a debugging host according to an embodiment of the inventive concept. Referring to FIG. 1, a server system according to an embodiment of the inventive concept may include a host 100 and a storage device 200. A debugging host 300 corresponding to a debugging tool may receive dump data from the storage device 200 through a wireless channel.

The host 100 may read or write data from or at the storage device 200. The host 100 may write data at the storage device 200 or may generate a command CMD used to read data stored in the storage device 200. In particular, the host 100 may search data stored in the storage device 200 in response to a request from a client and may provide the found result to the client.

The storage device 200 may provide data which the host 100 requests or may store data write requested by the host 100. In particular, when various errors or problems occur, the storage device 200 may generate dump data and may store the dump data in an internal memory such as a buffer memory 220. The dump data thus stored may be transmitted to the debugging host 300 automatically or in response to an external command. At this time, the dump data may be transmitted using a wireless channel.

To provide the dump data, the storage device 200 may include a storage controller 210, the buffer memory 220, and a nonvolatile memory device 230. Data which is provided according to a write request of the host 100 may be programmed at the nonvolatile memory device 230 through the buffer memory 220. If a read request is issued from the host 230, data which exists in the nonvolatile memory device 230 or the buffer memory 220 may be provided to the host 100. The storage controller 210 may control the buffer memory 220 and the nonvolatile memory device 230 based on a request of the host 100. The buffer memory 220 may be, for example, a dynamic random access memory (DRAM).

When an error occurs, the storage controller 210 may collect information about a point in time when an error occurs and may store the collected information in the buffer memory 220. The stored data may be the dump data. If the dump data is generated, the storage controller 210 may turn on (or activate) a wireless module (not shown) which the storage controller 200 includes and may transmit the dump data to the debugging host 300 through the wireless module. The transmission of the dump data may be performed automatically according to a policy of the storage device 200 or according to a command provided from the host 300.

The debugging host 300 may receive the dump data from the storage device 200 through the wireless channel. The debugging host 300 may analyze an error arising from the storage device 200 using the dump data. The debugging host 300 may manually receive the dump data transmitted through the wireless channel. Alternatively, the debugging host 300 may request the dump data by providing a command/address to the storage device 200 when the wireless channel is activated.

The dump data may be transmitted to the debugging host through the wireless channel by the above-described configuration and function of the storage device according to an embodiment of the inventive concept. Accordingly, it may be possible to obtain the dump data without attaching and detaching the storage device 200 to and from a device for physical connection with the debugging tool. In addition, it is unnecessary to use a separate test interface (e.g., JTAG) for connecting to the debugging tool. In other words, it may be possible to provide convenience of debugging.

Figure 2:
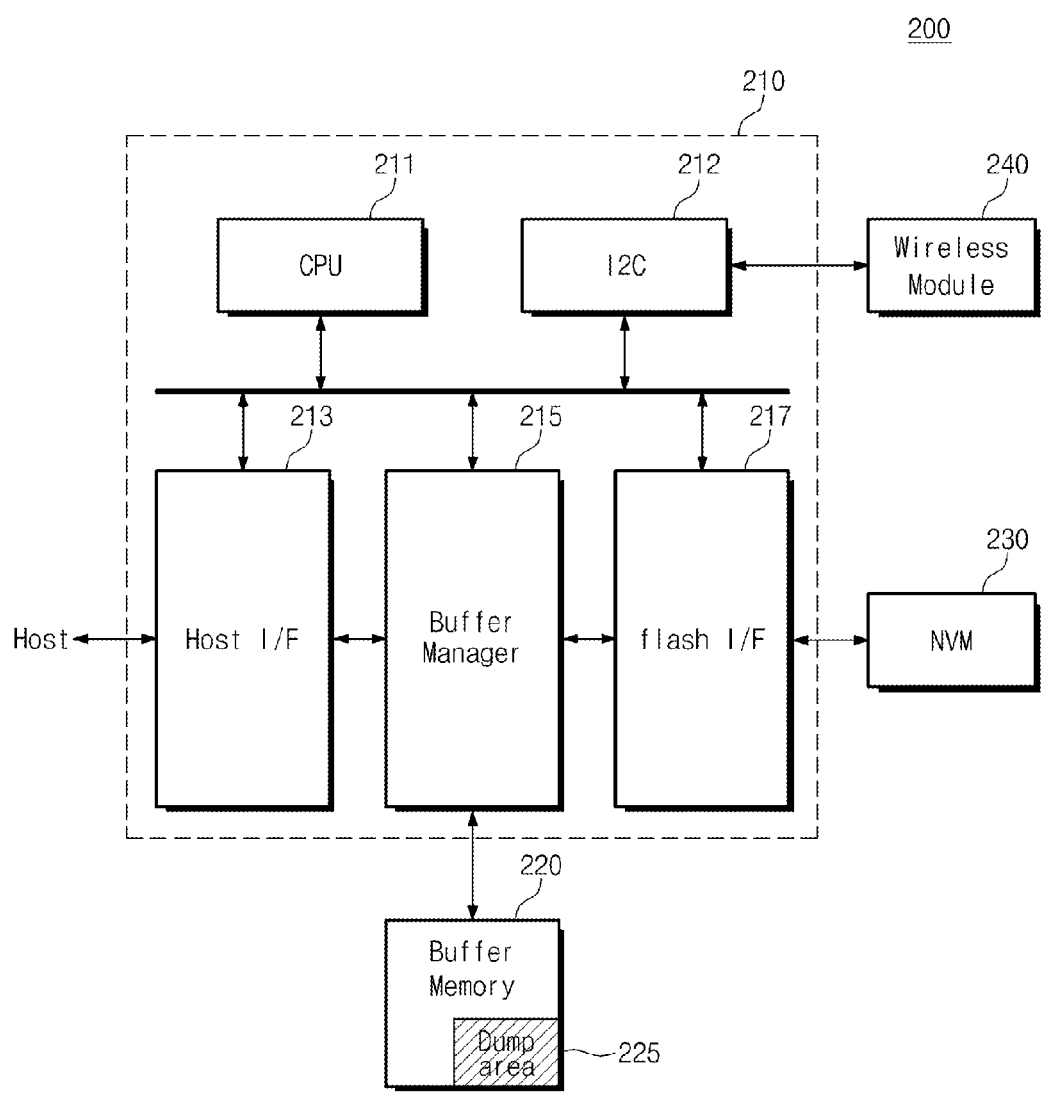
FIG. 2 is a block diagram schematically illustrating a storage device illustrated in FIG. 1.

FIG. 2 is a block diagram schematically illustrating a storage device 200 illustrated in FIG. 1. Referring to FIG. 2, the storage device 200 may include the storage controller 210, the buffer memory 220, the nonvolatile memory device 230, and a wireless module 240. The storage controller 210 may include a separate interface for transmission of dump data through the wireless module 240.

The storage controller 210 may include a central processing unit (CPU) 211, an inter-integrated circuit (I2C or I2C) interface 212, a host interface 213, a buffer manager 215, and a flash interface 217. The CPU 211 may transfer a variety of information, needed to perform a read/write operation about the nonvolatile memory device 230, to registers of the host interface 213 and flash interface 217. The CPU 211 may operate based on firmware which is provided for various control operations of the storage controller 210. For example, the CPU 211 may execute a flash translation layer (FTL) for garbage collection for managing the nonvolatile memory device 230, address managing, wear leveling, and the like.

The CPU 211 may detect a point in time when dump data is generated on the buffer memory 220 and may drive algorithm for activation/inactivation of the wireless module 240 and transmission of the dump data based on the detection result. That is, the CPU 211 may drive software modules for transmitting the dump data, collected on the buffer memory 220, to the debugging host 300. For example, the CPU 211 may include a detection module for detecting existence of dump data, a path activation module for activating a wireless module based on a detection result, and a transmission module for transmitting the detected dump data to the debugging host 300 through the wireless module 240.

The I2C interface 212 may be a bus interface which allows a plurality of masters to share at least one slave. The I2C interface 212 may provide an interface between the storage controller 210 and an external device. The I2C interface 212 may be a bus interface which includes one serial data line SDA and one serial clock line SCL and supports bidirectional communication. In the protocol of the I2C interface 212, a communication target may be determined as a bus master specifies a unique address of the communication target. The I2C interface 212 may use a bidirectional open collector line of a serial data line SDA and a serial clock line SCL to which a pull-up resistor is connected. A 7-bit address space may be defined by the protocol of the I2C interface 212, and a part thereof may be reserved.

However, it may be understood that the I2C interface 212 is replaced with various protocols such as a system management bus (SMBus), a universal asynchronous receiver transmitter (UART), a serial peripheral interface (SPI), a high-speed inter-chip (HSIC), and the like. Data communication (e.g., transmission and reception) with any device which the bus master specifies may be possible through the I2C interface 212. Since mechanism for evading bus competition is defined by the protocol of the I2C interface 212, a device arbitrarily specified may operate as a master. The I2C interface 212 may establish a transmission path of dump data to the debugging host 300 at a point in time when the wireless module 240 is activated.

The host interface 213 may communicate with the host 100. For example, the host interface 213 may provide a channel for communication with the host 100. The host interface 213 may provide a physical connection between the host 100 and the storage device 200. That is, the host interface 213 may interface with the storage device 200 in compliance with the bus format of the host 100. The bus format of the host 100 may include at least one of a universal serial bus (USB), a small computer system interface (SCSI), a PCI express, ATA, a parallel ATA (PTA), a serial ATA (SATA), or a serial attached SCSI (SAS).

The buffer manager 215 may control read and write operations of the buffer memory 220. For example, the buffer manager 215 may temporarily store write data or read data in the buffer memory 220.

The flash interface 217 may exchange data with the flash memory device 230. The flash interface 217 may write data transferred from the buffer memory 220 at the flash memory device 230. Read data which is read out from the flash memory device 230 and is provided through a memory channel may be collected by the flash interface 217. The collected data may be stored in the buffer memory 220.

The buffer memory 220 may be used as an input/output buffer of the storage device 200. In addition, the buffer memory 220 may store dump data of the storage device 200. In the case where an error arises from the storage device 200, the storage controller 210 may generate dump data and may write the dump data at a dump area 225 of the buffer memory 220. The buffer memory 220 may store a status of the storage device 200 or various monitored information.

The nonvolatile memory device 230 may be a storage medium where data write-requested by the host 100 is finally stored. The nonvolatile memory device 230 may be connected with the flash interface 217 of the storage device 200. The nonvolatile memory device 230 may include, for example, a flash memory. The nonvolatile memory device 230 may be implemented with nonvolatile memory elements such as electrically erasable and programmable ROM (EE-PROM), NAND flash memory, NOR flash memory, phase-change RAM (PRAM), resistive RAM (ReRAM), ferroelectric RAM (FRAM), spin-torque magnetic RAM (STT-MRAM), and the like. For descriptive convenience, it may be assumed that the nonvolatile memory device is a NAND flash memory.

In an embodiment of the inventive concept, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In an embodiment of the inventive concept, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

The wireless module 240 may exchange data with the debugging host 300 through the I2C interface 212. The wireless module 240 may be a communication module using a ZigBee, Bluetooth or Wi-Fi manner. The wireless module 240 may be automatically turned on or off by the storage device 200. Alternatively, the wireless module 240 may be turned on or off by a vendor unique command (VUC) provided from the host 100.

With the above description, the storage device 200 may transmit dump data to the debugging host 300 through the wireless module 240. The wireless module 240 may be controlled to be automatically turned on when the dump data is generated and to be automatically turned off if the transmission of the dump data is completed. Alternatively, the wireless module 240 may be controlled to be turned on or off according to the vendor unique command VUC. Accordingly, even though an error arises from the storage device 200, the debugging host 300 may obtain dump data without attaching and detaching the storage device 200 thereto or therefrom.

Figure 3:
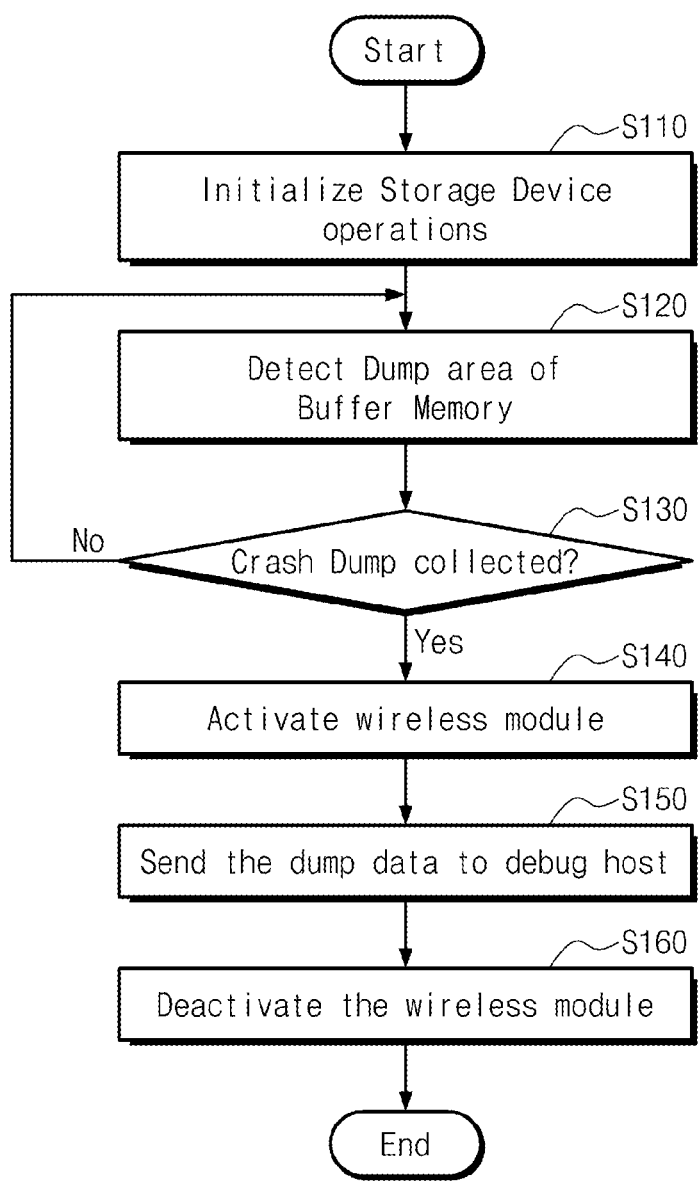
FIG. 3 is a flow chart schematically illustrating a dump data transmitting method of a storage device according to an embodiment of the inventive concept.

FIG. 3 is a flow chart schematically illustrating a dump data transmitting method of a storage device 200 according to an embodiment of the inventive concept. Referring to FIG. 3, the storage device 200 may automatically activate the wireless module 240 when dump data is generated and may transmit the dump data to the debugging host 300.

In step S110, at a booting operation where power is supplied or reset is performed, the storage device 200 may initialize a setting about an operation of the storage device 200. At this time, the wireless module 240 of the storage device 200 may be set to have a turn-off state. The wireless module 240 may be automatically turned on when the dump data is generated, and algorithm for transmitting the dump data to the debugging host 300 may be activated. In addition, a transfer mode about the dump data may be set. For example, one of an automatic transfer mode and a command transfer mode may be set with respect to the dump data.

In step S120, the storage device 200 may monitor whether dump data exists at the dump area 225 of the buffer memory 220. A status of a point in time when a hardware problem or a software processing error of the storage device 200 occurs may be made up as the dump data. The dump data thus made up may be written at the dump area 225 of the buffer memory 220. A detailed description about a manner in which dump data is made up at occurrence of an error is omitted. However, a manner for detecting generation of the dump data will be described using a manner such as writing of data at a specific area (e.g., the dump area 225 of the buffer memory 220). However, the scope and spirit of the inventive concept may not be limited thereto.

In step S130, an operation of the storage controller 210 may branch according to whether the dump data is stored in the dump area 225. If the dump data is not collected or recorded in the dump area 225 (No), the procedure may return to step S120 to monitor the generation of the dump data. In contrast, if the dump data exists in the dump area 225 (Yes), the procedure may proceed to step S140.

In step S140, the storage controller 210 may turn on the wireless module 240 in response to the generation of the dump data. The storage controller 210 may activate the wireless module 240 for the transmission of the dump data only when the dump data is detected.

In step S150, the storage controller 210 may transmit the dump data to the debugging host 300 through the wireless module 240. The transmission of the dump data through the wireless module 240 may be performed through the I2C interface 212 of the storage controller 210.

If the transmission of the dump data is completed, in step S160, the storage controller 210 may turn off the wireless module 240. Whether the transmission of the dump data is completed may be determined through a response from the debugging host 300.

With the above description, it may be possible to transmit the dump data, which is generated at a point in time when an error occurs, to the debugging host 300 without loss. In addition, since the storage device 200 is not detached from the host 100, it may be possible to prevent information from being lost due to detachment from the host 100.

Figure 4:
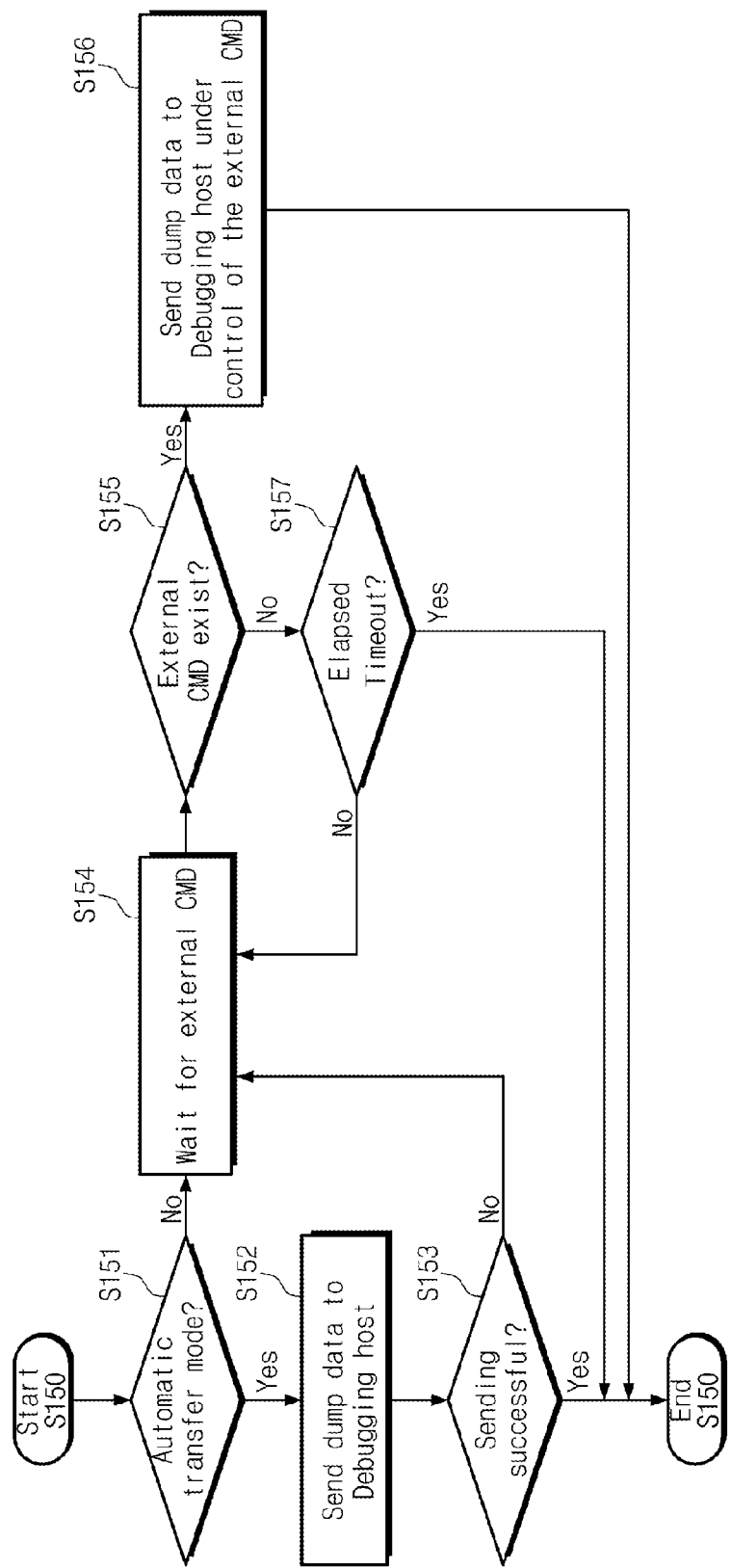
FIG. 4 is a flow chart schematically illustrating a dump data transmitting procedure (S150) according to an embodiment of the inventive concept.

FIG. 4 is a flow chart schematically illustrating a dump data transmitting procedure (S150) according to an embodiment of the inventive concept. Referring to FIG. 4, the storage device 200 may operate in an automatic transfer mode about dump data and a command transfer mode controlled by a command of the debugging host 300. This will be in more detail described below.

In step S151, the storage controller 210 may check a transfer mode about the dump data. The storage controller 210 may determine whether a transfer mode is an automatic transfer mode or a command transfer mode. If the transfer mode is the automatic transfer mode (Yes), the procedure may proceed to step S152. In contrast, if the transfer mode is the command transfer mode (No), the procedure may proceed to step S154.

In step S152, the storage controller 210 may automatically transmit the dump data to the debugging host 300 through the wireless module 240 without an external command or control. That is, the storage controller 210 may transmit the dump data stored in the buffer memory 220 to the wireless module 240 through the I2C interface 212. The wireless module 240 may transmit the dump data provided through the I2C interface 212 to the debugging host 300 in a wireless transmission manner. At this time, a transaction between the wireless module 240 and the debugging host 300 may be performed once or two or more times.

In step S153, the storage controller 210 may determine whether the debugging host 300 successfully receives the dump data. If receiving from the debugging host 300 a complete signal informing that the dump data is successfully received (Yes), the storage controller 210 may determine an overall automatic transfer operation of mode about the dump data as being completed. Accordingly, the storage controller 210 may terminate step S150 for the transmission of the dump data, and the procedure may proceed to step S160 in which the wireless module 240 is turned off. However, if the storage controller 210 does not receive from the debugging host 300 a complete signal informing that the dump data is successfully received (No), the procedure may proceed to step S154.

In step S154, the storage controller 210 may wait for an external command. This may be the case that the transfer mode is not the automatic transfer mode or the storage controller 210 does not receive a signal indicating that the debugging host 300 successfully receive dump data. Here, the external command may be a command provided from the debugging host 300. However, it may be understood that the external command is provided from the host 100 of a server.

In step S155, the storage controller 210 may determine whether the external command exists. In the case where the external command is not provided, the procedure may proceed to step S157 to check a time which elapses to wait for the external command. In the case where the external command is provided, the procedure may proceed to step S156.

In step S156, the storage controller may transmit collected dump data to the debugging host 300 in response to the external command. The debugging host 300 may request reading about dump data from the storage device 200 through a wireless channel. The storage controller 210 may transmit the collected dump data through the wireless channel in response to a command from the debugging host 300.

In step S157, the storage controller 210 may determine whether the external command is provided within a timeout. If a specific time does not elapse (e.g., timeout does not occur) (No), the storage controller 210 may continue to wait for the external command. If the specific time elapses (e.g., the timeout occurs) (Yes), the procedure may proceed to step S160, in which the wireless module 240 is turned off, without transmitting the dump data.

A detailed procedure of step S150 in which dump data is transmitted to the debugging host 300 automatically or in response to an external command is exemplified. However, it may be understood that in the automatic transfer mode control signals are exchanged with the debugging host 300 to transmit the dump data.

Figure 5:
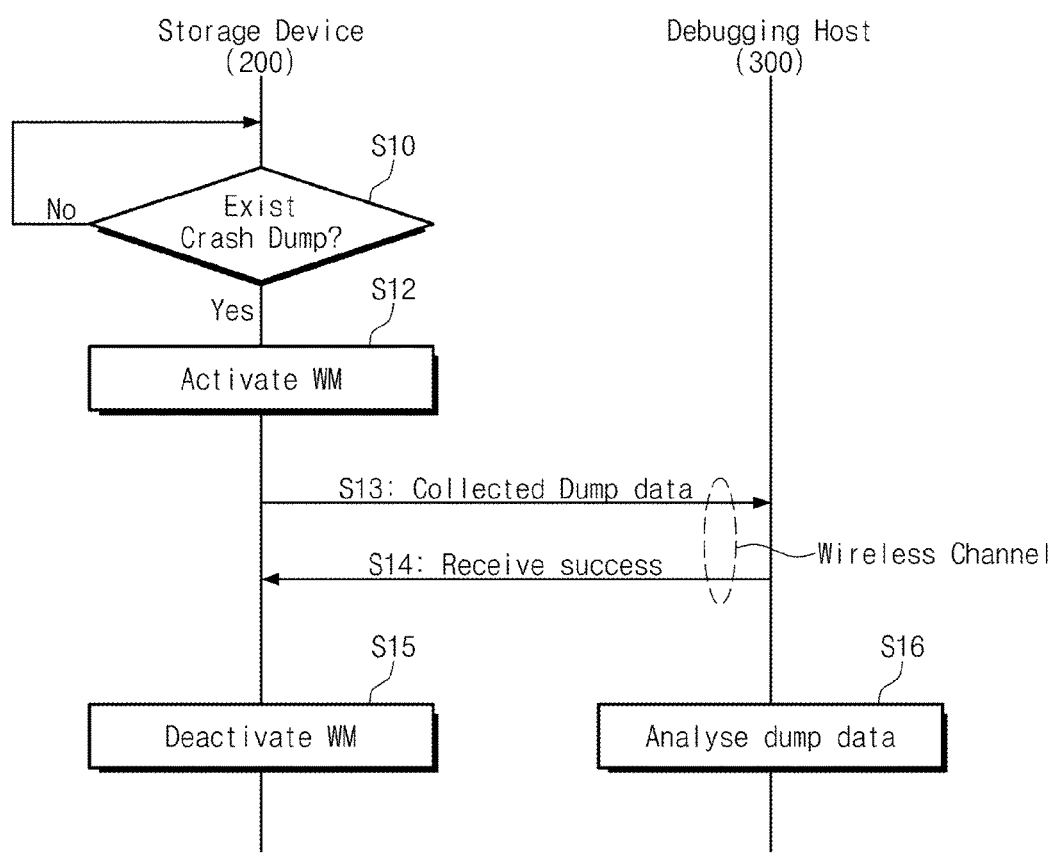
FIG. 5 is a diagram schematically illustrating a mutual relation between a storage device and a debugging host for transmission of dump data.

FIG. 5 is a diagram schematically illustrating a mutual relation between a storage device 200 and a debugging host 300 for transmission of dump data. Referring to FIG. 5, if dump data is collected, the storage device 200 may transmit the dump data to the debugging host 300 through a wireless module.

In step S10, the storage device 200 may detect an internal error or failure problem. In particular, the storage device 200 may determine the internal error or problem occurs, through existence of dump data or crash dump. According to a driving policy of the storage device 200, in the case where the internal error occurs, all data associated with the error may be collected, and the collected data may recorded at the dump area 225 of the buffer memory 220.

In step S12, the storage controller 200 may activate or turn on the wireless module 240 in response to the generation of the dump data. In a system of which power is not problematic, the wireless module 240 may be always turned on. However, the wireless module 240 may be used only in the case where the dump data is transmitted to the debugging host 300. For this reason, the wireless module 240 may be set to be activated or turned on only in the case where the dump data is generated. Control about the wireless module 240 may be implemented through the I2C interface 212 as described above.

In step S13, the storage device 200 may transmit the collected dump data to the debugging host 300 through the wireless channel. Step S13 is illustrated as being one data transmission step, but it may be a transfer mode according to an external mode or the automatic transfer mode. For the automatic transfer mode, the storage controller 200 may transmit the collected dump data to the debugging host 300 through the wireless module 240. For the command transfer mode, the storage device 200 may wait until the external command is received. The storage device 200 may transmit the collected dump data based on a sequence of the external command for reading the dump data.

In step S14, the debugging host 300 may determine whether to successfully receive the dump data through the wireless channel. The debugging host 300 may transmit a receive success or a complete to the storage device 200 based on the determination result.

In step S15, the storage device 200 may determine the transmission of the dump data as being completed and may turn off the wireless module 240. In the storage device 200, the wireless module 240 may be controlled through the I2C interface 212.

In step S16, the debugging host 300 may analyze the dump data including all status information of a point in time when an error occurs, without physical separation from the server or the host 100. The dump data transmitted through the wireless channel by the wireless module 240 may include information which is able to be lost due to detachment of the storage device 200 for debugging. In addition, in the case of transmitting the dump data through the wireless channel, efforts for connecting to a separate debugging interface (e.g., JTAG) for connection with the debugging tool may be unnecessary. With the above description, in the case of analyzing the dump data transmitted through the wireless channel, it may be possible to analyze an error which is not detected due to information lost according to detachment of the storage device 200.

Figure 6:
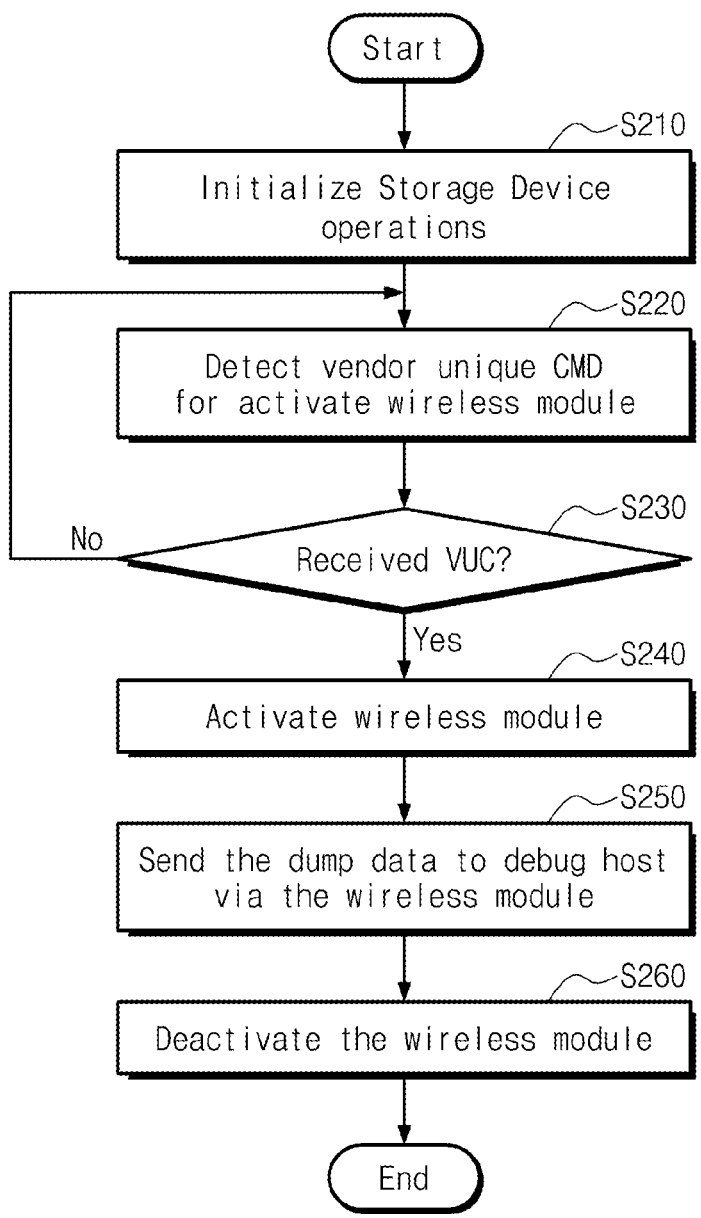
FIG. 6 is a flow chart schematically illustrating a dump data transmitting method of a storage device according to another embodiment of the inventive concept.

FIG. 6 is a flow chart schematically illustrating a dump data transmitting method of a storage device 200 according to another embodiment of the inventive concept. Even though dump data is generated, the storage device 200 may control the wireless module 240 based on a vendor unique command VUC. This will be in more detail described below.

In step S210, at a booting operation, the storage device 200 may initialize a setting about an operation thereof. The wireless module 240 of the storage device 200 may be set to have a turn-off or inactive state. Turn-on/off or activation/inactivation of the wireless module 240 may be set to be controlled by the vendor unique command VUC. Even though the dump data is collected, thus, the wireless module 240 may be first turned on or activated by the vendor unique command VUC to transmit the dump data to the debugging host 300. In addition, a transfer mode in which the dump data is transmitted to the debugging host 300 may be set. For example, one of an automatic transfer mode and a command transfer mode may be set with respect to the dump data.

In step S220, the storage controller 200 may determine whether the vendor unique command VUC for controlling the wireless module 240 is received. This operation may be performed even in the case where the dump data is collected. However, the wireless module 240 may be activated to collect user data such as background data or metadata, not the dump data.

In step S230, an operation of the storage controller 210 may branch according to whether the vendor unique command VUC is received. In the case where the vendor unique command VUC for activating the wireless module 240 is received (Yes), the procedure may proceed to step S240. In the case where the vendor unique command VUC is not received (No), the procedure may proceed to step S220 to continue to determine whether the vendor unique command VUC is received.

In step S240, the storage controller 210 may turn on the wireless module 240 in response to the vendor unique command VUC. Here, the storage controller 210 may use the I2C interface 212 to control the wireless module 240.

In step S250, the storage controller 210 may transmit the dump data to the debugging host 300 through the wireless module 240. The transmission of the dump data to the debugging host 300 through the wireless module 240 may be performed through the I2C interface 212 of the storage controller 210. In addition, the transmission of the dump data may be performed according to the automatic transfer mode or the command transfer mode. An operation of step S250 is similar to that of step S150 described with reference to FIG. 4, and a detailed description thereof is thus omitted.

If the transmission of the dump data is completed, in step S260, the storage controller 210 may turn off the wireless module 240. Whether the transmission of the dump data is completed may be determined through a response from the debugging host 300. Furthermore, it may be understood that the wireless module 240 is turned off according to the vendor unique command VUC as at turn-on.

An embodiment of the inventive concept is exemplified as activation of the wireless module 240 and wireless transmission of dump data are performed according to the vendor unique command VUC. In the case where the wireless module 240 is controlled by the vendor unique command VUC, data may be transmitted independently of collection of the dump data. The wireless module 240 which is controlled by the vendor unique command VUC may be used to collect user data or background status information as well as dump data.

Figure 7:
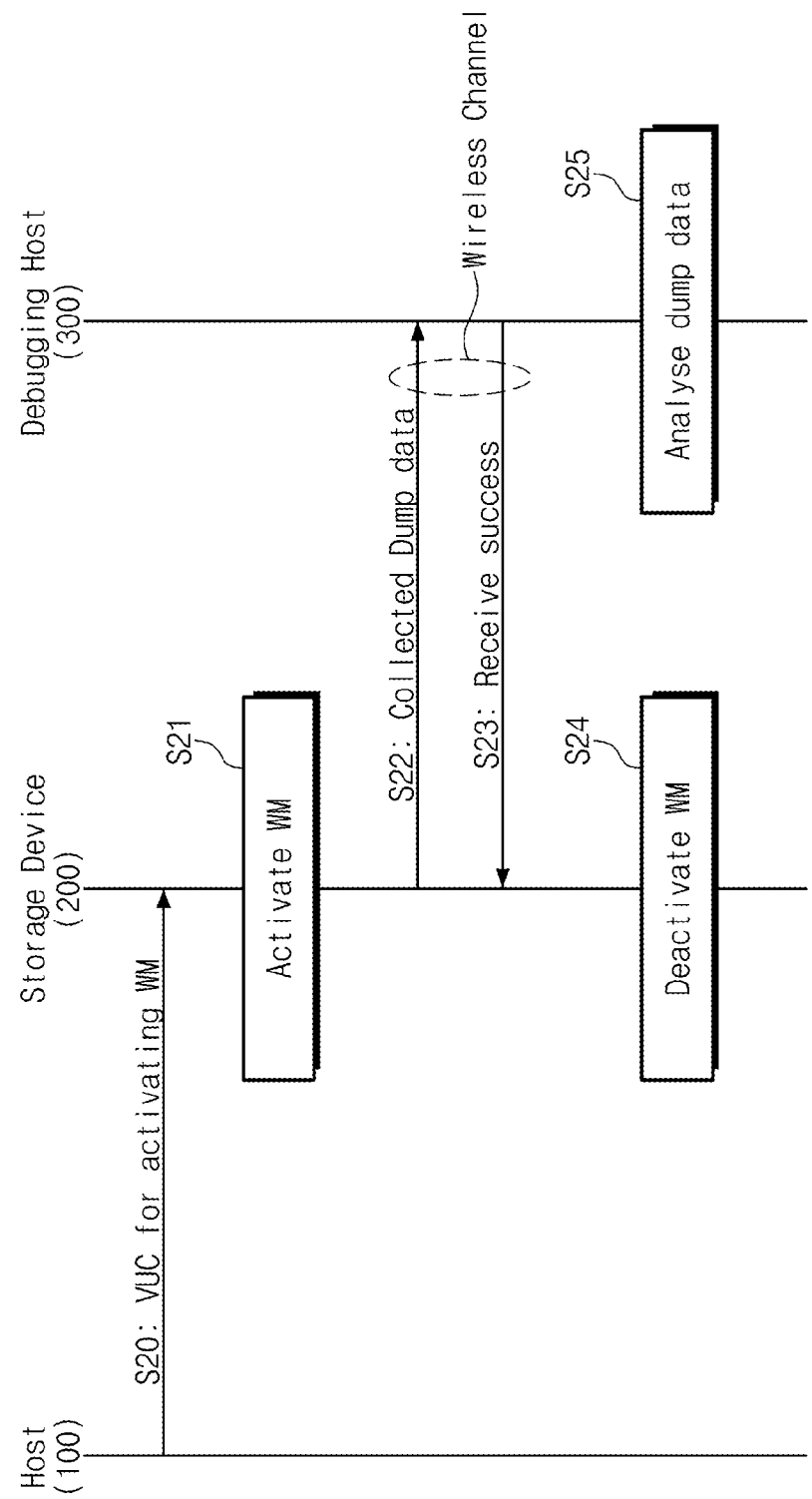
FIG. 7 is a diagram schematically illustrating a method for transmitting dump data in a wireless manner using a vendor unique command of FIG. 6.

FIG. 7 is a diagram schematically illustrating a method for transmitting dump data in a wireless manner using a vendor unique command VUC of FIG. 6. Referring to FIG. 7, the wireless module 240 may be activated by the vendor unique command VUC from the host 100. The storage device 200 may transmit the dump data to the debugging host 300 using the activated wireless module 240.

In step S20, the host 100 may provide the vendor unique command VUC for controlling the wireless module 240 to the storage device 200. This case may be the case that the vendor unique command VUC is provided after an internal error or problem arises from the storage device 200. However, it may be understood that the vendor unique command VUC for activating the wireless module 240 is provided to establish a wireless channel for an access to user data. Below, it is assumed that the dump data is collected.

In step S21, the storage controller 200 may turn on or activate the wireless module 240 in response to the vendor unique command VUC. Control about the wireless module 240 may be implemented through the I2C interface 212 as described above.

In step S22, the storage device 200 may transmit the collected dump data to the debugging host 300 through the wireless channel. Here, step S22 may correspond to an automatic transfer mode about dump data or a transfer mode performed according to an external command from the debugging host 300. For the automatic transfer mode, the storage controller 200 may transmit the collected dump data to the debugging host 300 through the wireless module 240 without intervention of an external device. In contrast, in the case of the command transfer mode, the storage device 200 may transmit the collected dump data in response to the external command from the debugging host 300.

In step S23, the debugging host 300 may determine whether to successfully receive the dump data through the wireless channel and may notify the storage device 200 of the determination result. The debugging host 300 may transmit a receive success or a complete to the storage device 200.

In step S24, the storage device 200 may determine the transmission of the dump data as being completed, in response to the receive success. The storage device 200 may turn off or inactivate the wireless module 240.

In step S25, the debugging host 300 may analyze the dump data including all status information of a point in time when an error occurs, without physical separation from the server or the host 100. The dump data transmitted through the wireless channel by the wireless module 240 may include information which is able to be lost due to detachment of the storage device 200 for debugging. Furthermore, the debugging host 300 may establish a wireless access channel about user data using an authentication procedure and may obtain various background data or status information about the storage device 200 as well as dump data. With the above description, in the case of analyzing the dump data or the user data, it may be possible to analyze a problem which is not detected due to information lost according to detachment of the storage device 200.

Figure 8:
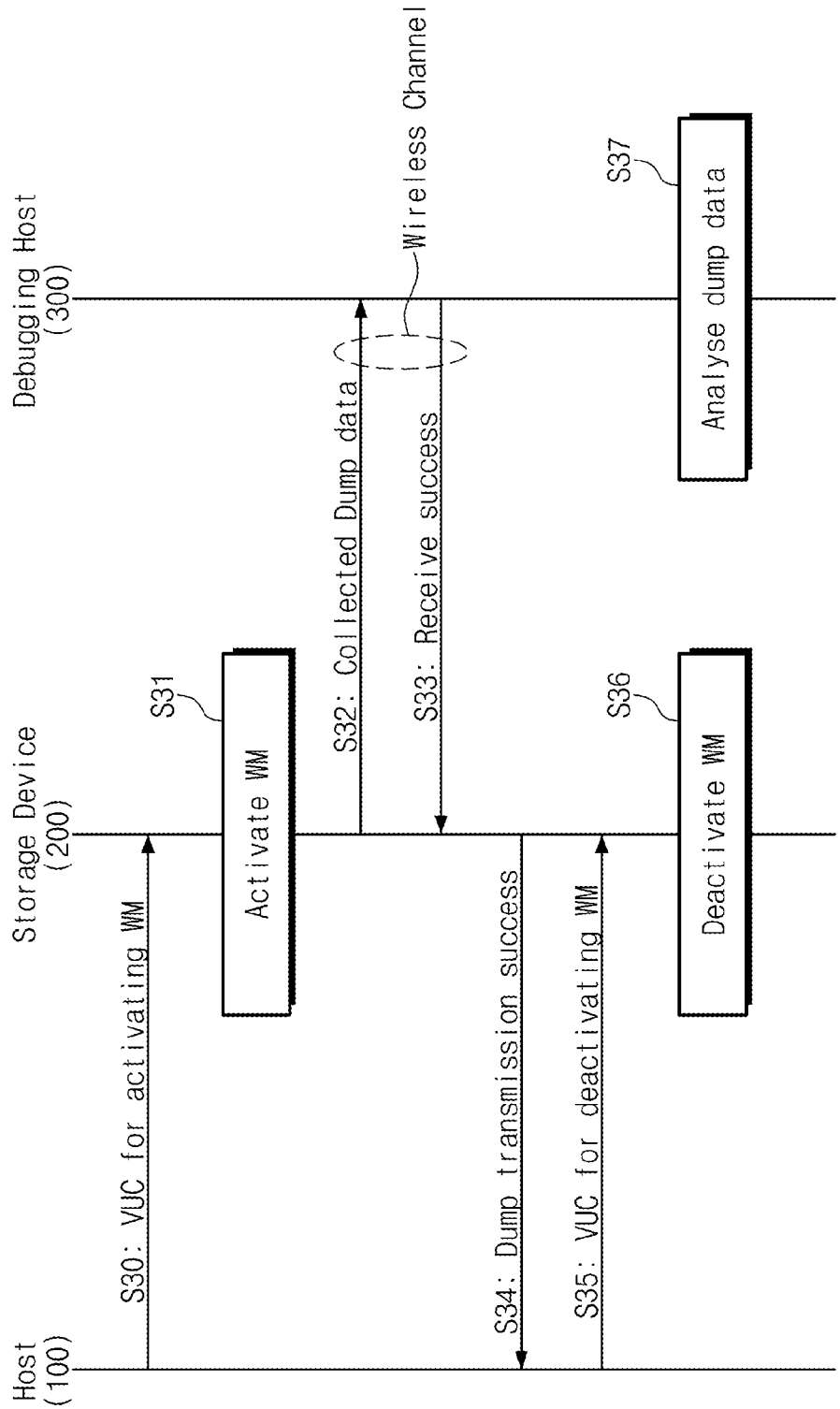
FIG. 8 is a diagram schematically illustrating a method for transmitting dump data in a wireless manner using a vendor unique command, according to another embodiment of the inventive concept.

FIG. 8 is a diagram schematically illustrating a method for transmitting dump data in a wireless manner using a vendor unique command, according to an embodiment of the inventive concept. Referring to FIG. 8, the wireless module 240 may be activated and inactivated by the host 100. Steps S30 to S33 may be substantially the same as those S20 to S23 of FIG. 7, and a detailed description thereof is thus omitted. That is, in step S33, the storage device 200 may receive from the debugging host 300 that the dump data is successfully received.

In step S34, the storage device 200 may notify the host 100 that the transmission of the dump data to the debugging host 300 is completed. In step S35, the host 100 may provide the vendor unique command VUC for turning off the wireless module 240 to the storage device 200.

In step S36, the storage device 200 may turn off the wireless module 240 in response to the vendor unique command VUC from the host 100. In step S37, the debugging host 300 may analyze the dump data transmitted through the wireless channel.

An embodiment of the inventive concept is exemplified as both turn-on and turn-off the wireless module 240 of the storage device 200 are controlled according to the vendor unique command VUC.

Figure 9:
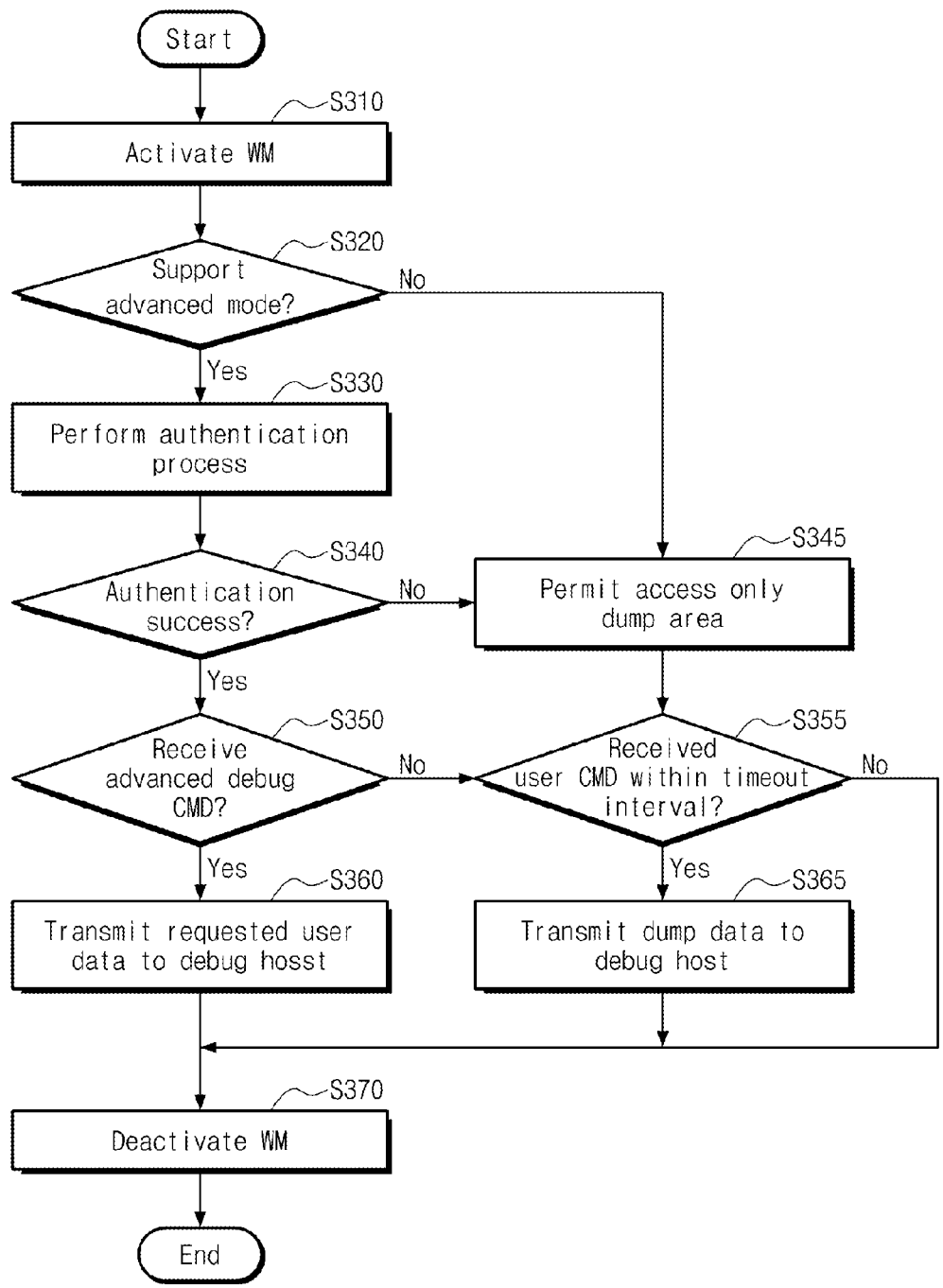
FIG. 9 is a flow chart illustrating another embodiment of the inventive concept.

FIG. 9 is a flow chart illustrating another embodiment of the inventive concept. Referring to FIG. 9, the debugging host 300 may access the buffer memory 220 of the storage device 200 through the wireless module 240 in a normal mode or an advanced mode. That is, the debugging host 300 may use the wireless channel in a normal mode manner where an access to the dump area is made for debugging. Alternatively, the debugging host 300 may use the wireless channel in an advance mode manner where an access to a user area of the buffer memory 220 of the storage device 200 is made at a debugging operation. This will be in more detail described below.

In step S310, the storage controller 210 may activate the wireless module 240 automatically or in response to the vendor unique command VUC.

In step S320, the storage controller 210 may determine whether the advanced mode allowing an access to a user area as well as dump data is supported to the debugging host 300. An operation of the storage controller 210 may branch according to the determination result. In the case where the advanced mode is not supported (No), the procedure may proceed to step S345. In contrast, in the case where the storage controller 210 supports the advanced mode at the debugging operation (Yes), the procedure may proceed to step S330.

In step S330, the storage controller 210 may perform an authentication procedure of the debugging host 300. For example, the storage controller 210 may request a password or an authentication key from the debugging host 300 and may determine whether inputted password or authentication key corresponds to specific information. Here, the password or the authentication key may be information which is based on ID information of the storage device 210.

In step S340, an operation of the storage controller 210 may branch according to the authentication result. That is, in the case where authentication of the debugging host 300 succeeds (Yes), the procedure may proceed to step S350. In contrast, in the case where authentication of the debugging host 300 fails (No), the procedure may proceed to step S345.

In step S345, the storage controller 210 may allow the debugging host 300 to access the dump area 225 and may prevent the debugging host 300 from accessing the user area.

In step S350, the storage controller 210 may receive a command for an access to the user area. The debugging host 300 may provide the storage device 200 with a command/address for reading metadata, indicating an operating state of the storage device 200, monitoring data, various driving information from the user area. If the command for an access to the user area is not received from the debugging host 300 (No), the procedure may proceed to step S355. In contrast, if the command for an access to the user area is received from the debugging host 300 (Yes), the procedure may proceed to step S360.

In step S355, the storage controller 210 may determine whether a command from the debugging host 300 is received within timeout. If a command/address for an access to a dump area 225 is received within the timeout (Yes), the procedure may proceed to step S365. If the command/address for an access to a dump area 225 is not received within the timeout (No), the procedure may proceed to step S370.

In step S360, the storage controller 210 may transmit user data, which the debugging host 300 requests, to the debugging host 300 through the wireless module 240.

In step S370, the storage controller 210 may turn off or inactivate the wireless module 240 because the transmission of user data or dump data is completed or a command is not received within the timeout.

Although not shown, the debugging host 300 may analyze an error about the storage device 200 using the transmitted dump data or user data. The dump data or user data transmitted through the wireless channel by the wireless module 240 may include information which is able to be lost due to detachment of the storage device 200 for debugging. Various background data or state information about the storage device 200 may be obtained through the user data. With the above description, in the case of analyzing the dump data or the user data provided through the wireless channel, it may be possible to analyze a problem which is not detected due to information lost according to detachment of the storage device 200.

Figure 10:
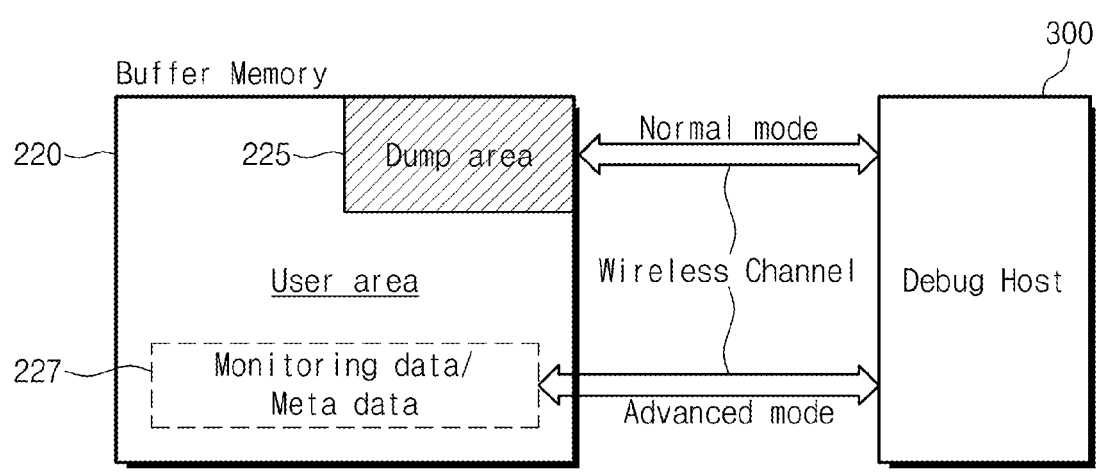
FIG. 10 is a block diagram schematically illustrating an area of a buffer memory accessed in a normal mode or an advanced mode of FIG. 9.

FIG. 10 is a block diagram schematically illustrating an area of a buffer memory 220 accessed in a normal mode or an advanced mode of FIG. 9. Referring to FIG. 10, the dump area 225 of the buffer memory 220 may be read through a normal mode access by the debugging host 300. In contrast, monitoring data or metadata 227 stored in a user area may be read by an advanced mode access.

Figure 11:
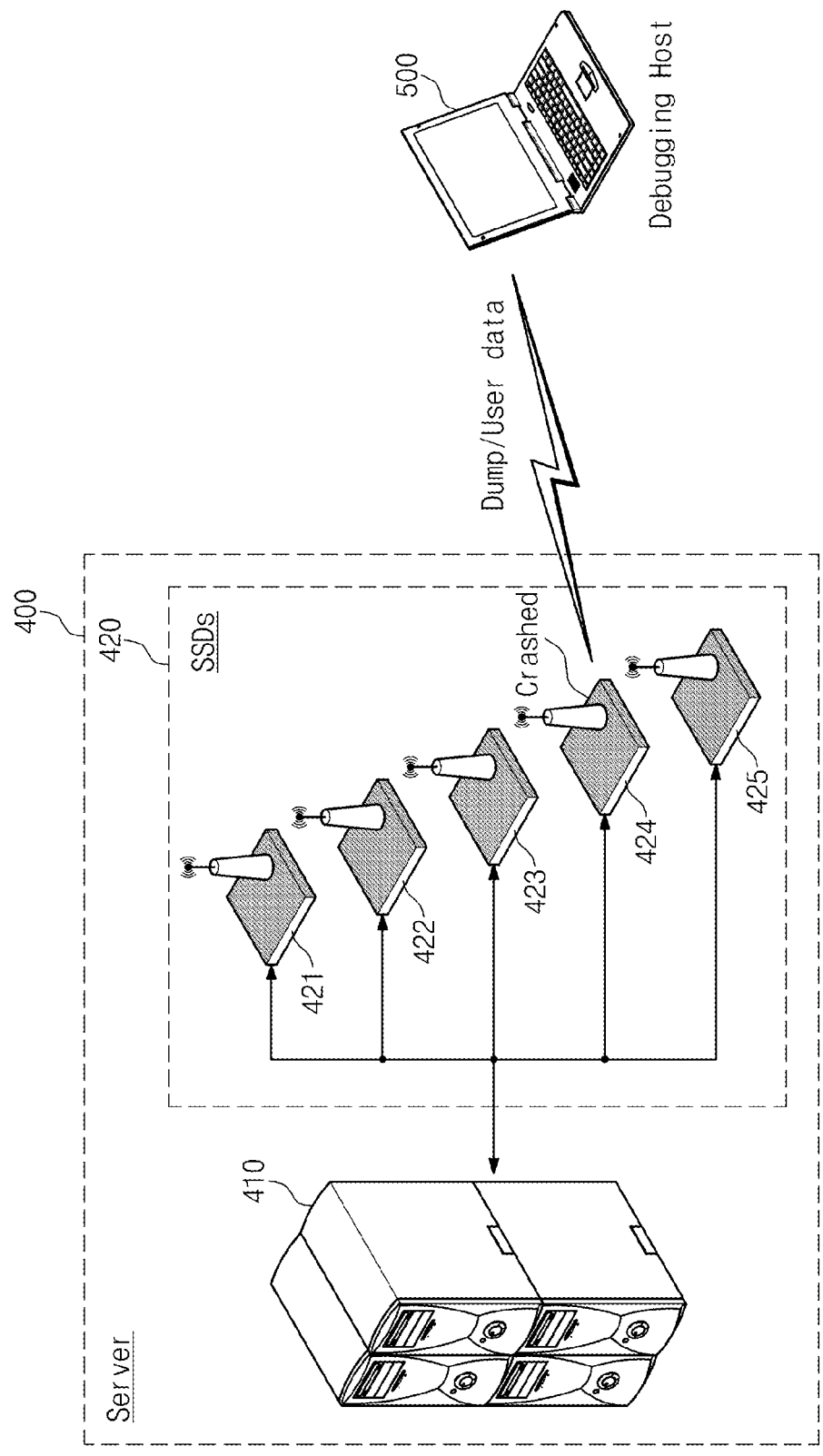
FIG. 11 is a block diagram illustrating a server system according to an embodiment of the inventive concept.

FIG. 11 is a block diagram illustrating a server system according to an embodiment of the inventive concept. Referring to FIG. 11, a server system 400 may include a server host 410 and a solid state drive 420 as storage. A debugging host 500 may receive dump data or user data from the solid state drive 420 through a wireless channel and may perform a debugging operation based on the received data.

The server host 410 may store data, which a client requests, in the solid state drive 420. The server host 410 may search the solid state drive 420 and may provide data which a client requests.

The solid state drive 420 is connected to the server host 410 to exchange data therewith. The solid state drive 420 may include a plurality of solid state drives 421, 422, 423, 424, and 425. Each of the solid state drives 421, 422, 423, 424, and 425 may include a wireless module which is independently activated/inactivated. In the case where an error arises from at least one (e.g., 424) of the solid state drives 421, 422, 423, 424, and 425 and the dump data is collected, the solid state drive 424 from which an error arises may activate the wireless module. The solid state drive 424 may transmit the collected dump data to the debugging host 500 automatically or based on a command. Here, the automatic transmission may mean that dump data is transmitted without intervention of an external device.

Figure 12:
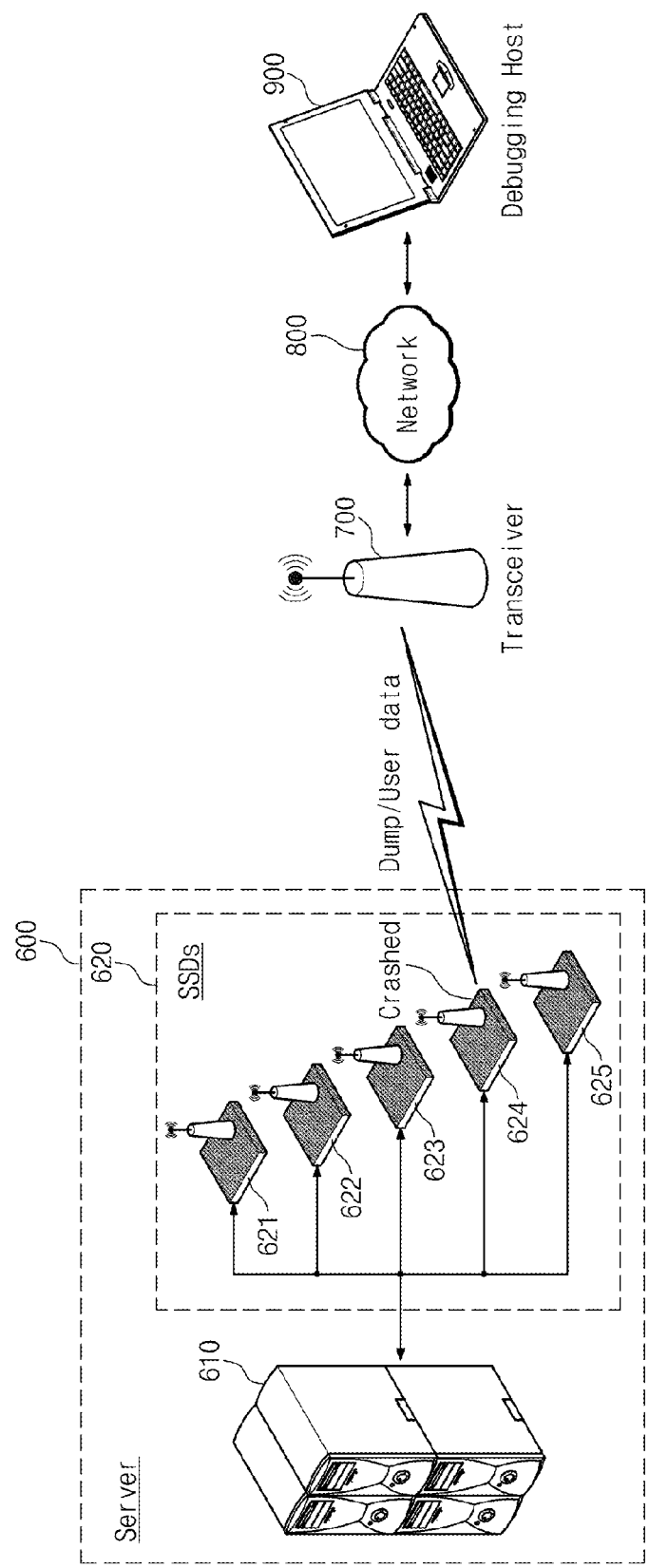
FIG. 12 is a block diagram illustrating a server system according to another embodiment of the inventive concept.

FIG. 12 is a block diagram illustrating a server system according to another embodiment of the inventive concept. Referring to FIG. 12, a server system 600 may include a host 610 and a solid state drive 620.

The solid state drive 620 may be connected to the server host 610 to exchange data therewith. The solid state drive 620 may include a plurality of solid state drives 621, 622, 623, 624, and 625. Each of the solid state drives 621, 622, 623, 624, and 625 may include a wireless module which is independently activated/inactivated. In the case where an error arises from at least one (e.g., 624) of the solid state drives 621, 622, 623, 624, and 625 and the dump data is collected, the solid state drive 624 from which an error arises may activate the wireless module. The solid state drive 624 may transmit the collected dump data to a transceiver 700 through a wireless channel so as to be transmitted to a debugging host 900 through a network 800. Dump data or user data received through the transceiver 700 may be transmitted to the debugging host 900 through the network 800.

Figure 13:
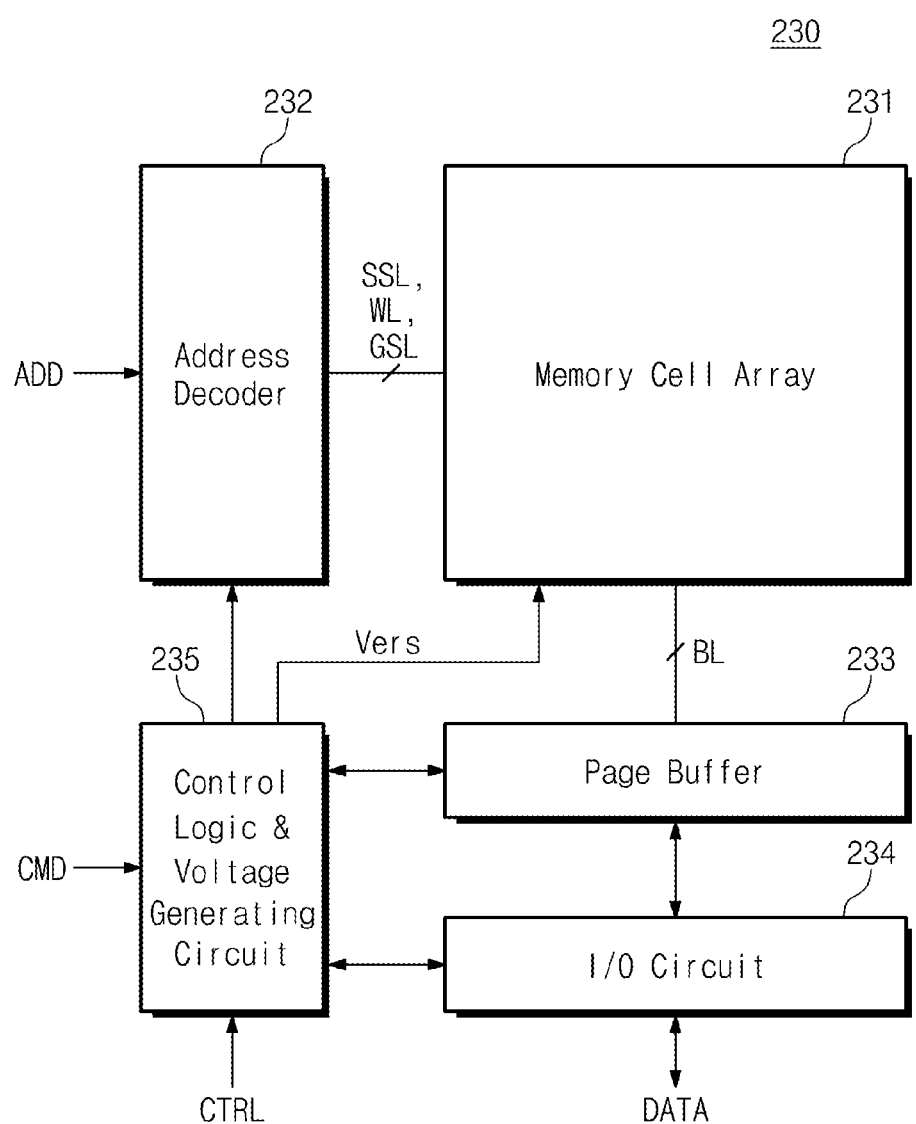
FIG. 13 is a block diagram schematically illustrating a nonvolatile memory described in FIG. 1.

FIG. 13 is a block diagram schematically illustrating a nonvolatile memory described in FIG. 1. Referring to FIG. 13, a nonvolatile memory 230 may include a memory cell array 231, an address decoder 232, a control logic and voltage generator circuit 235, a page buffer 233, and an input/output circuit 234.

The memory cell array 231 may include a plurality of memory cells. Each of the memory blocks may include a plurality of cell strings. Each of the cell strings may include a plurality of memory cells. The memory cells may be connected with a plurality of word lines WL. Each memory cell may be a single level cell (SLC) storing one bit or a multi-level cell (MLC) storing at least two bits.

The address decoder 232 may be connected with the memory cell array 231 through the word lines WL, string selection lines SSL, and ground selection lines GSL The address decoder 232 may receive and decode a physical address ADD from an external device (e.g., the device controller 110) and may drive the word lines based on the decoding result. For example, the address decoder 232 may decode a physical address ADD received from the external device, may select at least one of the word lines based on the decoded physical address ADD, and may drive the selected word line.

The control logic and voltage generator circuit 235 may control the address decoder 232, the page buffer 233, and the input/output circuit 234 in response to a storage command CMD and a control logic CTRL from the external device. For example, the control logic and voltage generator circuit 235 may control other components in response to the signals CMD and CTRL such that data is stored in the memory cell array 231. Alternatively, the control logic and voltage generator circuit 235 may control other components in response to the signals CMD and CTRL such that data stored in the memory cell array 231 is transmitted to the external device.

The page buffer 233 may be connected to the memory cell array 231 through the bit lines BL. Under control of the control logic and voltage generator circuit 235, the page buffer 233 may control the bit lines BL such that data provided from the input/output circuit 234 is stored in the memory cell array 231. Under control of the control logic and voltage generator circuit 235, the page buffer 233 may read data stored in the memory cell array 231 and may provide the read data to the input/output circuit 234. For example, the page buffer 233 may be provided with data from the input/output circuit 234 by the page or may read data from the memory cell array 231 by the page.

The input/output circuit 234 may receive data from the external device and may transfer the received data to the page buffer 233. Alternatively, the input/output circuit 234 may receive data from the page buffer 233 and may transmit the received data to the external device. For example, the input/output circuit 234 may exchange data with the external device in synchronization with the control signal CTRL.

The control logic and voltage generator circuit 235 may generate various voltages required for the nonvolatile memory 230 to operate. For example, the control logic and voltage generator circuit 235 may generate a plurality of program voltages, a plurality of pass voltages, a plurality of verification voltages, a plurality of selection read voltages, a plurality of non-selection read voltages, a plurality of erase voltages, and the like. The control logic and voltage generator circuit 235 may provide the generated voltages to the address decoder 232 or to a substrate of the memory cell array 231.

Figure 14:
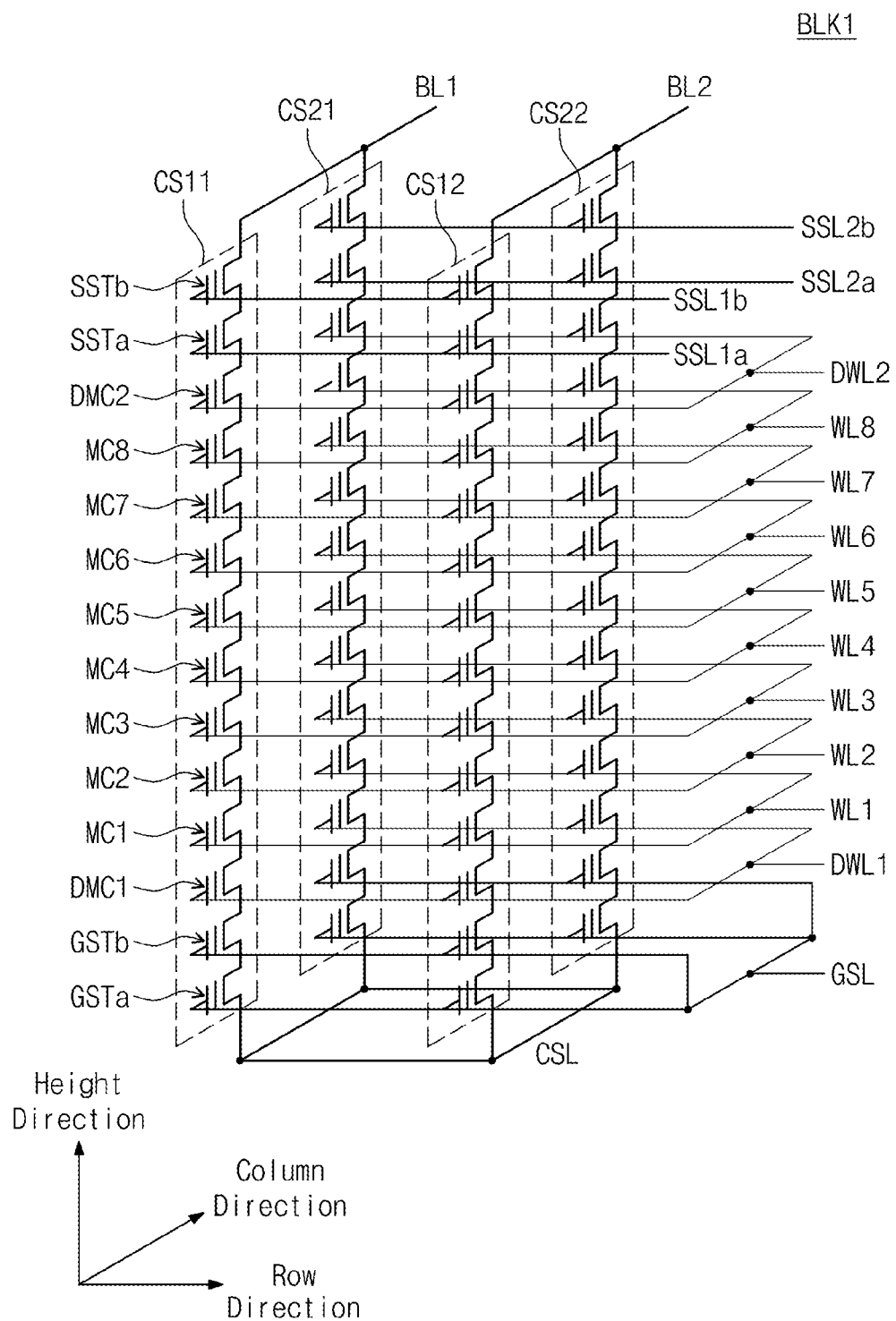
FIG. 14 is a circuit diagram schematically illustrating one of memory blocks included in a cell array of a nonvolatile memory device of FIG. 13.

FIG. 14 is a circuit diagram schematically illustrating one of memory blocks included in a cell array of a nonvolatile memory device of FIG. 13. In FIG. 14, there is illustrated a first memory block BLK1 having a three-dimensional structure. However, the scope and spirit of the inventive concept is not limited thereto. The remaining memory blocks may have the same structure as the first memory block BLK1.

Referring to FIG. 14, the first memory block BLK1 may include a plurality of cell strings CS11, CS21, CS12, and CS22. The cell strings CS11, CS21, CS12, and CS22 may be arranged along a row direction and a column direction and may form rows and columns For example, the cell strings CS11 and CS12 may be connected to string selection lines SSL1*a* and SSL1*b* to form a first row. The cell strings CS21 and CS22 may be connected to string selection lines SSL2*a* and SSL2*b* to form a second row.

For example, the cell strings CS11 and CS21 may be connected to a first bit line BL1 to form a first column. The cell strings CS12 and CS22 may be connected to a second bit line BL2 to form a second column Each of the cell strings CS11, CS21, CS12, and CS22 may include a plurality of cell transistors. Each of the cell strings may include string selection transistor SSTa and SSTb, a plurality of memory cells MC1 to MC8, ground selection transistors GSTa and GSTb, and dummy memory cells DMC1 and DMC2.

In exemplary embodiments, each of the memory cells included in the cell strings CS11, CS12, CS21, and CS22 may be a charge trap flash (CTF) memory cell.

The memory cells MC1 to MC8 may be serially connected and may be stacked a height direction being a direction perpendicular to a plane defined by a row direction and a column direction. The string selection transistors SSTa and SSTb may be serially connected and may be disposed between the memory cells MC1 to MC8 and a bit line BL. The ground selection transistors GSTa and GSTb may be serially connected and may be disposed between the memory cells MC1 to MC8 and a common source line CSL.

In exemplary embodiments, a first dummy memory cell DMC1 may be disposed between the memory cells MC1 to MC8 and the ground selection transistors GSTa and GSTb.

In exemplary embodiments, a second dummy memory cell DMC2 may be disposed between the memory cells MC1 to MC8 and the string selection transistors SSTa and SSTb.

The ground selection transistors GSTa and GSTb of the cell strings CS11, CS12, CS21, and CS22 may be connected in common to a ground selection line GSL.

In exemplary embodiments, ground selection transistors in the same row may be connected to the same ground selection line, and ground selection transistors in different rows may be connected to different ground selection lines. For example, the first ground selection transistors GSTa of the cell strings CS11 and CS12 in the first row may be connected to a first ground selection line, and the first ground selection transistors GSTa of the cell strings CS21 and CS22 in the second row may be connected to a second ground selection line.

In exemplary embodiments, although not shown, ground selection transistors placed at the same height from a substrate may be connected to the same ground selection line, and ground selection transistors placed at different heights therefrom may be connected to different ground selection lines. For example, the first ground selection transistors GSTa of the cell strings CS11, CS12, CS21, and CS22 may be connected to the first ground selection line, and the second ground selection transistors GSTb thereof may be connected to the second ground selection line.

Memory cells placed at the same height from the substrate (or the ground selection transistors GSTa and GSTb) may be connected in common to the same word line, and memory cells placed at different heights therefrom may be connected to different word lines. For example, the first to eighth memory cells MC8 of the cell strings CS11, CS12, CS21, and CS22 may be connected in common to first to eighth word lines WL1 to WL8, respectively.

String selection transistors, belonging to the same row, from among the first string selection transistors SSTa at the same height may be connected to the same string selection line, and string selection transistors belonging to different rows may be connected to different string selection lines. For example, the first string selection transistors SSTa of the cell strings CS11 and CS12 in the first row may be connected in common to the string selection line SSL1a, and the first string selection transistors SSTa of the cell strings CS21 and CS22 in the second row may be connected in common to the string selection line SSL1a.

Likewise, string selection transistors, belonging to the same row, from among the second string selection transistors SSTb at the same height may be connected to the same string selection line, and string selection transistors in different rows may be connected to different string selection lines. For example, the second string selection transistors SSTb of the cell strings CS11 and CS12 in the first row may be connected in common to a string selection line SSL1b, and the second string selection transistors SSTb of the cell strings CS21 and CS22 in the second row may be connected in common to a string selection line SSL2b.

Although not shown, string selection transistors of cell strings in the same row may be connected in common to the same string selection line. For example, the first and second string selection transistors SSTa and SSTb of the cell strings CS11 and CS12 in the first row may be connected in common to the same string selection line. The first and second string selection transistors SSTa and SSTb of the cell strings CS21 and CS22 in the second row may be connected in common to the same string selection line.

In exemplary embodiments, dummy memory cells at the same height may be connected to the same dummy word line, and dummy memory cells at different heights may be connected with different dummy word lines. For example, the first dummy memory cells DMC1 may be connected to a first dummy word line DWL1, and the second dummy memory cells DMC2 may be connected to a second dummy word line DWL2.

In the first memory block BLK1, read and write operations may be performed by the row. For example, one row of the first memory block BLK1 may be selected by the string selection lines SSL1a, SSL1b, SSL2a, and SSL2b.

For example, the cell strings CS11 and CS12 of the first row may be connected to the first and second bit lines BL1 and BL2 when a turn-on voltage is supplied to the string selection lines SSL1a and SSL1b and a turn-off voltage is supplied to the string selection lines SSL2a and SSL2b. The cell strings CS21 and CS22 of the second row may be connected to the first and second bit lines BL1 and BL2 when a turn-on voltage is supplied to the string selection lines SSL2a and SSL2b and a turn-off voltage is supplied to the string selection lines SSL1a and SSL1b. Memory cells, having the same height, from among memory cells of cell strings in a driven row may be selected by driving a word line. A read or write operation may be performed with respect to the selected memory cells. The selected memory cells may constitute a physical page.

In the first memory block BLK1, erasing may be performed by the memory block or by the sub-block. When erasing is performed by the memory block, all memory cells MC of the first memory block BLK1 may be simultaneously erased according to one erase request. When erasing is performed by the sub-block, a part of memory cells MC in the first memory block BLK1 may be simultaneously erased according to one erase request, and the other thereof may be erase-inhibited. A low voltage (e.g., a ground voltage) may be supplied to a word line connected to the erased memory cells, and a word line connected to erase-inhibited memory cells may be floated.

The first memory block BLK1 illustrated in FIG. 14 may be exemplary. For example, the number of cell strings may increase or decrease, and the number of rows of cell strings and the number of columns of cell strings may increase or decrease according to the number of cell strings. In the first memory block BLK1, the number of cell strings (GST, MC, DMC, SST, or the like) may increase or decrease, and a height of the first memory block BLK1 may increase or decrease according to the number of cell strings (GST, MC, DMC, SST, or the like). Furthermore, the number of lines (GSL, WL, DWL, SSL, or the like) connected with cell transistors may increase or decrease according to the number of cell strings (GST, MC, DMC, SST, or the like).

Figure 15:
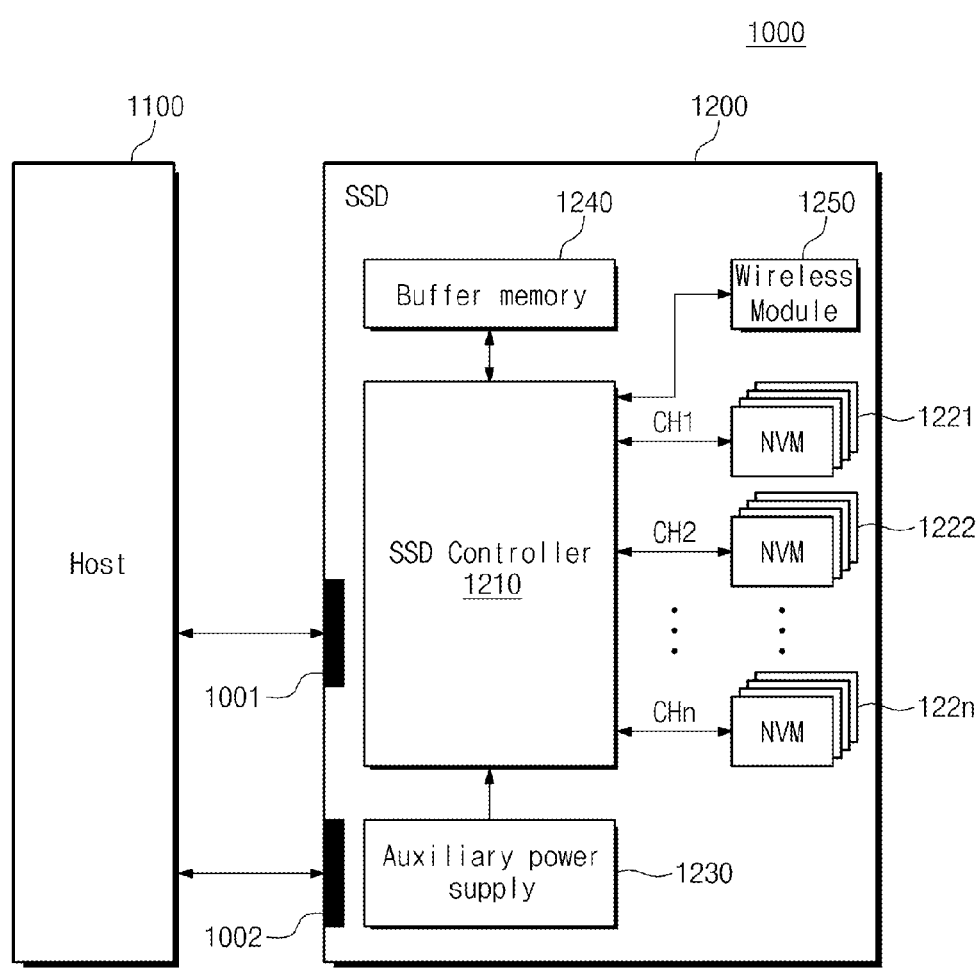
FIG. 15 is a block diagram illustrating a solid state drive including a nonvolatile memory system according to an embodiment of the inventive concepts.

FIG. 15 is a block diagram illustrating a solid state drive including a nonvolatile memory system according to an embodiment of the inventive concepts. Referring to FIG. 175 a solid state drive (SSD) system 1000 may include a host 1100 and an SSD 1200. The SSD 1200 may exchange signals SGL with the host 1100 through the host interface 1001 and may be supplied with a power through a power connector 1002. The SSD 1200 may include an SSD controller 1210, a plurality of flash memories 1221 to 122n, an auxiliary power supply 1230, a buffer memory 1240, and a wireless module 1250.

The SSD controller 1210 may control the flash memories 1221 to 122n in response to the signal SIG from the host 1100. In an embodiment, the SSD controller 1210 may transmit dump data or user data to a debugging host (not shown) through the wireless module 1250 based on components described with reference to FIG. 2.

The auxiliary power supply 1230 may be connected to the host 1100 via the power connector 1002. The auxiliary power supply 1230 may be charged by a power PWR from the host 1100. When a power is not smoothly supplied from the host 1100, the auxiliary power supply 1230 may power the SSD system 1000. The auxiliary power supply 1230 may be placed inside or outside the SSD 1200. For example, the auxiliary power supply 1230 may be put on a main board to supply an auxiliary power to the SSD 1200.

The buffer memory 1240 may act as a buffer memory of the SSD 1200. For example, the buffer memory 1240 may temporarily store data received from the host 1100 or from the flash memories 1221 to 122*n* or may temporarily store metadata (e.g., mapping tables) of the flash memories 1221 to 122*n*. The buffer memory 1240 may include volatile memories such as DRAM, SDRAM, DDR SDRAM, LPDDR SDRAM, SRAM, and the like or nonvolatile memories such as FRAM ReRAM, STT-MRAM, PRAM, and the like.

Figure 16:
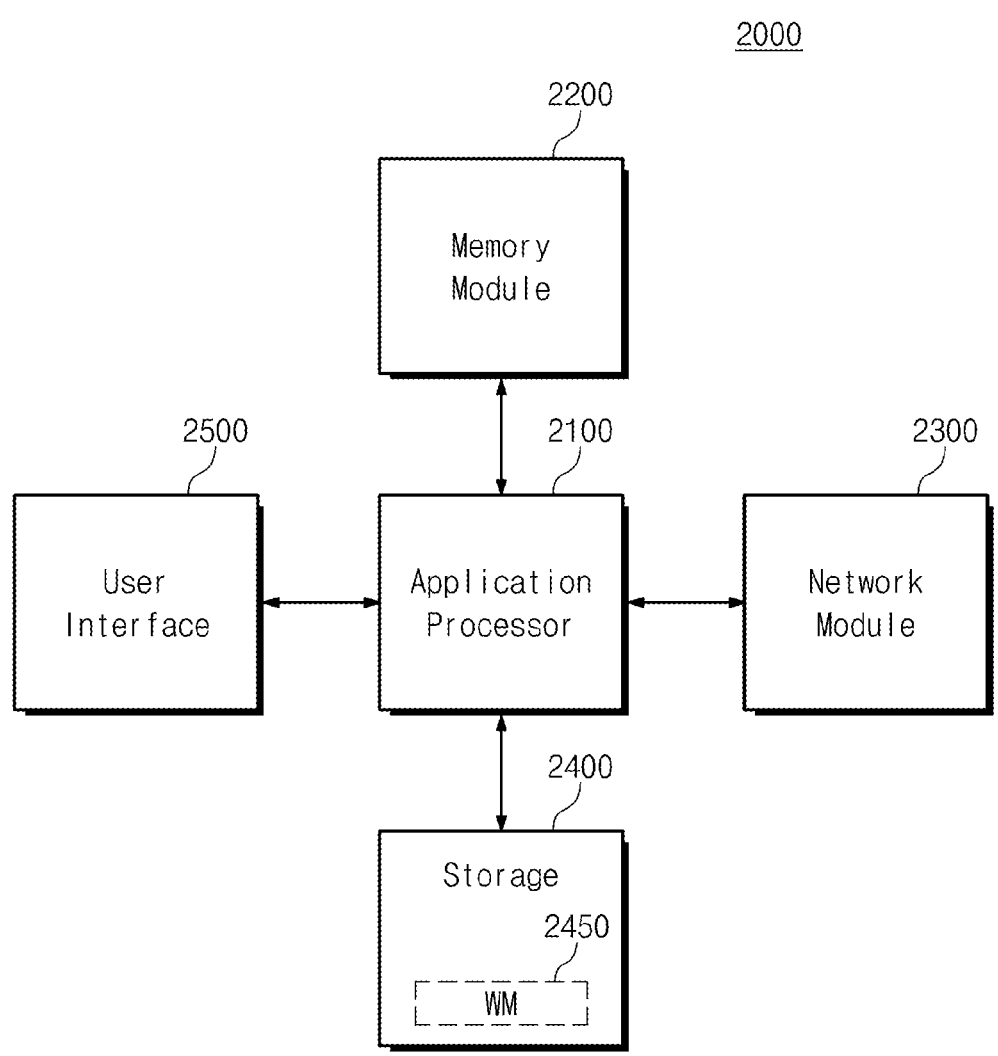
FIG. 16 is a block diagram illustrating a user system including a storage device according to an embodiment of the inventive concept.

FIG. 16 is a block diagram illustrating a user system including a storage device according to an embodiment of the inventive concept. Referring to FIG. 16, a user system 2000 may include an application processor 2100, a memory module 2200, a network module 2300, a storage module 2400, and a user interface 2500.

The application processor 2100 may drive components, an operating system, and the like of the user system 2000. For example, the application processor 2100 may include controllers for controlling components of the user system 2000, graphics engines, a variety of interfaces, and the like. For example, the application processor 2100 may be a system-on-chip (SoC).

The memory module 2200 may operate as a main memory, a working memory, a buffer memory, or a cache memory of the user system 2000. The memory module 2200 may be implemented with a volatile random access memory, such as DRAM, SDRAM, double date rate DRAM (DDR SDRAM), DDR2 SDRAM, DDR3 SDRAM, LPDDR DRAM, LPDDR2 DRAM, or LPDDR3 DRAM or a nonvolatile random access memory, such as PRAM, MRAM, RRAM, or FRAM.

The network module 2300 may communicate with external devices. For example, the network module 2300 may support wireless communications, such as code division multiple access (CDMA), global system for mobile communication (GSM), wideband CDMA (WCDMA), CDMA-2000, time division multiple access (TDMA), long term evolution (LTE), Wimax, WLAN, UWB, Bluetooth, WI-DI, and the like. In an embodiment, the network module 2300 may be included in the application processor 2100.

The storage module 2400 may store data. For example, the storage module 2400 may store data received from the application processor 2100. Alternatively, the storage module 2400 may provide the application processor 2100 with data stored therein. For example, the storage module 2400 may be implemented with a semiconductor memory device such as PRAM, MRAM, RRAM, NAND flash memory, NOR flash memory, or a three-dimensional NAND flash memory.

The storage module 2400 may include a wireless module 2450. The storage module 2400 may transmit dump data, which is collected in a buffer memory of the storage module 2400 such as a DRAM, to a debugging device automatically or based on an external command.

The user interface 2500 may include interfaces which input data or a command in the application processor 2100 or output data to an external device. For example, the user interface 2500 may include user input interfaces such as a keyboard, a keypad, buttons, a touch panel, a touch screen, a touch pad, a touch ball, a camera, a microphone, a gyroscope sensor, a vibration sensor, and the like. The user interface 2500 may further include user output interfaces such as a liquid crystal display (LCD), an organic light-emitting diode (OLED) display device, an active matrix OLED (AMOLED) display device, a light-emitting diode (LED), a speaker, a motor, and the like.

A flash memory device and/or a memory controller according to the inventive concept may be packaged according to any of a variety of different packaging technologies. Examples of such packaging technologies may include the following: package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), small outline (SOIC), shrink small outline package (SSOP), thin small outline (TSOP), thin quad flatpack (TQFP), system in package (SIP), multi-chip package (MCP), wafer-level fabricated package (WFP), and wafer-level processed stack package (WSP).

According to an embodiment of the inventive concept, it may be possible to transmit dump data to a debugging tool without physical separation from a host or without power-off of a storage device. In addition, the storage device of the inventive concept may provide state information for monitoring of the storage device through a wireless channel with an authentication procedure at a user request. Accordingly, the storage device of the inventive concept may enable debugging of high reliability and may markedly reduce a cost for the debugging.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A storage device which generates dump data upon an occurrence of an error, the storage device comprising:
   a buffer memory comprising a dump area for storing the dump data;
   a wireless module that transmits the dump data, which is received from the dump area, to a wireless channel; and
   a storage controller that, in response to detecting the dump data within the dump area, turns on the wireless module and transmits the dump data from the dump area to the wireless module.

2. The storage device of claim 1, wherein the storage controller turns on the wireless module without external intervention.

3. The storage device of claim 2, wherein the storage controller turns off the wireless module in response to detecting that transmission of the dump data from the wireless module to the wireless channel is completed.

4. The storage device of claim 1, wherein the storage controller transmits the dump data to the outside based on an external command provided through the wireless module, with the wireless module turned on.

5. The storage device of claim 4, wherein the storage controller turns off the wireless module when the external command is not received through the wireless module during a reference time from a turn-on point in time of the wireless module.

6. The storage device of claim 1, wherein the storage controller comprises at least one of an I2C interface, a system management bus (SMBus) interface, a universal asynchronous receiver transmitter (UART) interface, a serial peripheral interface (SPI), and a high-speed inter-chip (HSIC) interface.

7. The storage device of claim 1, wherein the storage controller performs a turn-on or turn-off operation of the wireless module in response to a vendor unique command provided from a host.

8. The storage device of claim 7, wherein the storage controller is provided with the vendor unique command for turning off the wireless module when the dump data is successfully transmitted to a debugging host.

9. The storage device of claim 1, wherein the storage controller allows access to a user area of the buffer memory through the wireless module using an authentication procedure.

10. The storage device of claim 1, further comprising:
a nonvolatile memory device configured to store data stored in the buffer memory, wherein
the nonvolatile memory device includes a three-dimensional memory array.

11. A debugging method of a storage device electrically connected with a host, the debugging method comprising:
determining whether dump data exists in a dump area of a buffer memory;
turning on a wireless module in response to determining that the dump data exists in the dump area;
transmitting the dump data from the dump area to a debugging device through the wireless module and a wireless channel in response to turning on the wireless module; and
turning off the wireless module upon completing the transmission of the dump data to the debugging device.

12. The debugging method of claim 11, wherein the storage device transmits the dump data to the debugging device based on a command provided from the debugging device.

13. The debugging method of claim 11, wherein the turning off of the wireless module is performed in response to a message received from the debugging device.

14. The debugging method of claim 11, further comprising transmitting data of a user area of the buffer memory to the debugging device through an authentication procedure with the wireless module turned on.

15. The debugging method of claim 11, wherein the storage device comprises a solid state drive connected with the host based on a universal serial bus (USB) protocol, a small computer system interface (SCSI) protocol, a PCI express protocol, an ATA protocol, a parallel ATA (PTA) protocol, a serial ATA (SATA) protocol, or a serial attached SCSI (SAS) protocol.

* * * * *